United States Patent [19]

Alexander

[11] Patent Number: 5,221,208
[45] Date of Patent: Jun. 22, 1993

[54] TEACHING AID

[76] Inventor: William D. Alexander, 27 Halfway Street, Sidcup, Kent DA15 8LQ, England

[21] Appl. No.: 622,718

[22] Filed: Dec. 4, 1990

[30] Foreign Application Priority Data

Dec. 7, 1989 [GB] United Kingdom ............... 8927675

[51] Int. Cl.⁵ ........................................... G09B 23/28
[52] U.S. Cl. .................................................. 434/271
[58] Field of Search ............... 434/262, 267, 270, 271; 40/361; 269/8; 623/4; 351/205, 206

[56] References Cited

U.S. PATENT DOCUMENTS

| | | | |
|---|---|---|---|
| 971,026 | 9/1910 | DeZeng | 434/271 |
| 1,535,163 | 4/1925 | Kintner | 434/271 |
| 1,630,944 | 5/1927 | Ingersoll | 434/271 |
| 2,018,175 | 10/1935 | Knight | 40/361 |
| 2,068,950 | 1/1937 | Hamilton | 434/271 |
| 2,309,390 | 1/1943 | Grossgoth et al. | 434/94 |
| 3,624,942 | 12/1971 | Klohr | 434/270 |
| 3,711,929 | 1/1973 | Blakey et al. | 269/8 |
| 3,905,130 | 9/1975 | Gordon et al. | 434/271 |
| 4,185,406 | 1/1980 | Schotsman | 40/361 |
| 4,461,463 | 7/1984 | Okubo | 269/8 |

FOREIGN PATENT DOCUMENTS

| | | | |
|---|---|---|---|
| 2549971 | 2/1985 | France | 40/361 |
| 4386 | 2/1906 | United Kingdom | 434/271 |
| 732843 | 6/1955 | United Kingdom | 434/271 |

Primary Examiner—Robert Bahr
Attorney, Agent, or Firm—Bauer & Schaffer

[57] ABSTRACT

A teaching aid for those learning to use an opthalmoscope has a chamber with a first generally hemisperical wall formed with an aperture through which a photographic image of the retinal surface of an eye located in the chamber may be viewed. The image is preferably selectable from a number of different retinal images indicative of different conditions so a person using the aid may rapidly learn to recognize them. A frame extends through a slot in a further wall of the chamber so that a photographic image can pass via the slot into the chamber. The frame may form a second chamber wall opposite said aperture or be located within the chamber and spaced from its walls. A wholly spherical chamber has a frame extending diametrically across it, whilst another provides the image on an inner concave wall of the chamber. In this latter, the first and second walls are releasably joined and the second is selectable from a number of second walls bearing different images. The chamber, if spherical, may be provided with a flat on its outer surface by which it may rest on a flat wall of a support. The chamber and support may have respective magnetized and magnetizable elements such that the two are biased together when one is on the other. The support may have a plurality of support elements for supporting images used in the chamber.

5 Claims, 4 Drawing Sheets

TEACHING AID

FIELD OF THE INVENTION

The invention relates to teaching aids, in particular aids enabling the users of ophthalmoscopes to increase their facility in using such instruments.

An ophthalmoscope is a device by means of which a a person may view the interior of another's eye. Such viewing is of importance in the diagnosis of problems directly concerned with an individuals eye and in determining the presence or absence of certain conditions in the body of the person being tested —for example, diabetes and hypertension can have a marked effects on the retinal surface of a sufferer's eye.

In general an ophthalmoscope is an instrument having a light source adjacent a lens —light from the light source being directed away from one side of the lens and generally focussed at the focal point of the lens. The arrangement is such that a user may direct light from the ophthalmoscope through the pupil and into a patients eye and by peering through the lens from its other side may view the interior of the patients eye (e.g. he or she may scan the rear, retinal surface of the eye to determine if it shows signs indicating that the patient is suffering from a particular condition).

Experience has shown that, certainly in the initial stages, students and others whom must learn to use ophthalmoscopes have considerable difficulty in handling the instrument.

The eyes of individuals tend to be relatively small, tend to move and it is generally difficult to ensure that an ophthalmoscope is correctly positioned in front of a patients pupil so that a user can clearly see into the patients eye.

A first object of the invention is to alleviate, at least in part, this difficulty and to provide an aid which may be used to readily teach and enhance the ability with which a user of an ophthalmoscope may use that instrument.

Again, the teaching of recognition of the physical effects in a patients eye of certain physical conditions is difficult —clearly a great number of patients suffering known conditions must be observed before an individual learning to use an ophthalmoscope will have the ability to readily recognise the existence of any particular condition from scanning a patients eye.

A second object of the invention is to alleviate, at least in part, this difficulty and to provide an aid which will increase the rate at which an individual may learn, using an ophthalmoscope, to readily recognise the effects in a patients eye of various conditions from which a patient may be suffering.

SUMMARY OF THE INVENTION

In one aspect the invention provides a teaching aid comprising a hollow chamber having a first wall part formed with an aperture therein through which aperture the interior of the chamber may be viewed, and means enabling an image of an interior portion of an eye to be located in a chamber such that said image may be viewed through said aperture.

Preferably said image is a photographic image of the retinal surface of an eye.

A person learning the use of an opthalmoscope may make use of the aid to gain manual dexterity and familiarity with the aid before beginning to use the instrument on patients.

With advantage said first wall part of the chamber including said aperture is generally hemispherical; which enhances the similarity of the aid to a patients eye.

Again, with advantage the photographic image of the interior portion of an eye provided within the chamber is selectable from a number of different photographic images of retinal portions of eyes so as to enable those different photographic images to be viewed within the aid.

By selecting different images indicative of different conditions a person making use of the aid may more rapidly learn to recognise those conditions than would otherwise be the case.

Desirably said chamber is provided with a frame for supporting said image in a desired location within said chamber.

The frame is with especial advantage accessible from outside the chamber such that a photographic image in the frame may be removed therefrom and replaced with another one of a number of different photographic images.

In one arrangement embodying the invention the frame extends through a slot in said chamber such that a photographic image may be passed through said slot to said frame. Preferably the frame comprises a generally rectangular flat part three peripheral edges of which are provided with generally L-shaped elements upstanding from and partially overlying the plane of the flat part so that a photographic image passed to the frame is held by the L-shaped elements on the flat part of the frame.

The frame may be formed as or comprise a second wall part of said chamber opposed to said aperture in the first wall part of the chamber.

In the alternative the frame may be located within said chamber spaced from the first and a second wall part thereof.

The chamber may be spherical and the plane of the frame of the aid extend diamtrically across the chamber.

The chamber may be spherical and said image be provided within the chamber on an inner concave surface of a second wall part of the chamber opposed to said aperture in said first wall part thereof.

In such an arrangement the second wall part upon which the image is provided is releasably connected to said first wall part and is selectable from a number of second wall parts bearing different photographic images of retinal portions of eyes so as to enable those different photographic images to be viewed within the aid.

The aperture may be provided with a lens approximating that of a human eye.

The aperture may be provided with a light sensitive shutter mechanism approximating the iris of the human eye.

In the arrangement in which the chamber is spherical it may further be provided with a flat on the outer surface thereof by which the chamber may rest on a generally flat wall of a base support, the chamber and the base support being provided with respective magnetized and magnetizable elements such that when placed thereon the chamber is biased to remain on the base support.

Such a base support, if provided, may have a plurality of support elements for supporting a photographic image which may be used in the chamber.

Embodiments of the invention provide a plurality of teaching aids each defined above the diameters of the chambers of which are of different dimensions.

The above and other aspects, features and advantages of the invention will become apparent from the following description of an embodiment of the invention made with reference to the accompanying drawings, in which:

DESCRIPTION OF THE PREFERRED EMBODIMENTS

Figure 1A:
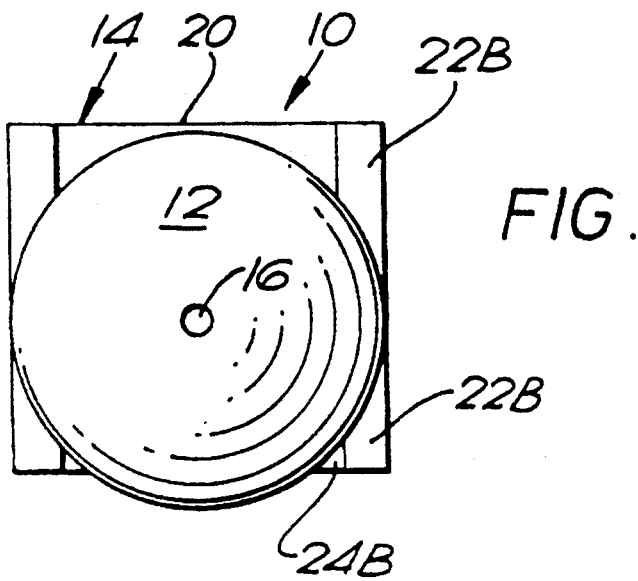
FIG. 1 shows at A and B respectively face and plan views of a first teaching aid embodying the invention and at C a perspective view showing part of the aid in more detail.

With reference now to the drawings, the teaching aid shown in FIG. 1, comprises a chamber 10 having a hemispherical front wall 12 and a rear wall member 14 in the form of a photographic image holder as will be described in detail with reference to FIG. 1C.

Generally centrally of wall 12 there is an aperture 16 through which the interior of chamber 10 —and in particular any photographic image held in frame 14 —may be viewed by a user with an ophthalmoscope.

Figure 1B:
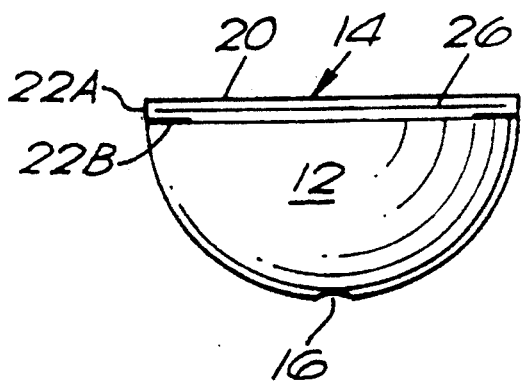
Figure 1C:
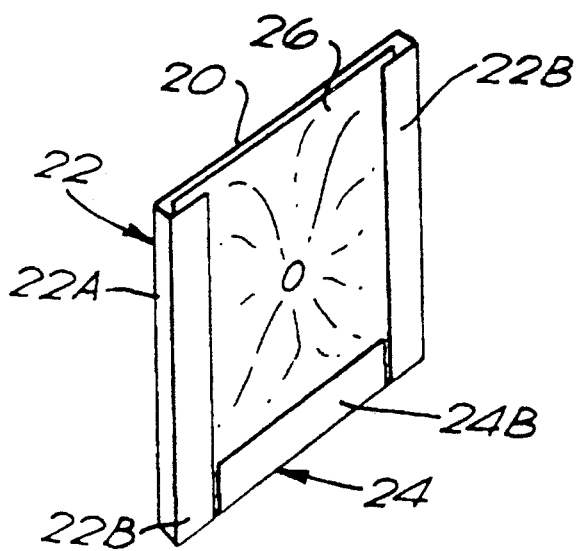

The rear wall member 14 closing chamber 10 as can be seen from FIG. 1C comprises a flat plate 20 the vertical (as viewed in FIG. 1C) sides of which carry generally L-shaped members 22 each having a portion 22A extending normally of plate 20 and a portion 22B extending generally parallel to and overlying part of plate 20.

The lowermost (as viewed in FIG. 1C) edge of plate 20 carries a similar L-shaped member 24 that is to say a portion extending normally of plate 20 and a portion 24B extending generally parallel to and overlying part of plate 20.

Member 14 is generally square and has dimensions approximating to the largest diameter of the hemispherical front wall 12.

Front wall 12 and rear wall member 14 of the aid are of any suitable plastics, wood or other material and are joined one to the other in the relative positions shown in any suitable way, for example by welding or glueing, or by screwing, stapling or rivetting; such that there is a generally light tight joint between the two of them.

It will be appreciated with the particular arrangement shown a photographic image, such as for example a photograph mounted on a card as illustrated at 26, the dimensions of which are greater than the spacing of the facing ends of the portions 22B but less than the spacing of the portion 22A may be passed to holder 14 and retained generally flat against plate 20 by the return portions 22B and 24B of the members 22 and 24.

It will be seen from FIGS. 1A, 1b and 1C that when retained in this position the image 26 may be viewed by a person looking through the aperture 16 in hemispherical front wall 12 with an ophthalmoscope.

It is preferably provided that photographic image 26 is one of a series of different images each illustrating a retinal surface of an eye (e.g. a human eye) and that by providing the series of photographs are taken of the retinal surfaces of the eyes of illustrating the effects on the retinal surface of those eyes of different physical conditions (e.g. hypertension, diabetes and the like) it is possible for the aid to be used to illustrate to a user the effects of those conditions on the human eye.

Any photographic image 26 placed in the aid of FIG. 1 may, if desired, be readily removed therefrom and replaced with another by a user simply grasping the upper exposed portion of the edge of the image at the upper edge (as viewed in the Figures) of plate 20 —or by simply upending the aid allowing the photograph to fall out of it.

Figure 2A:
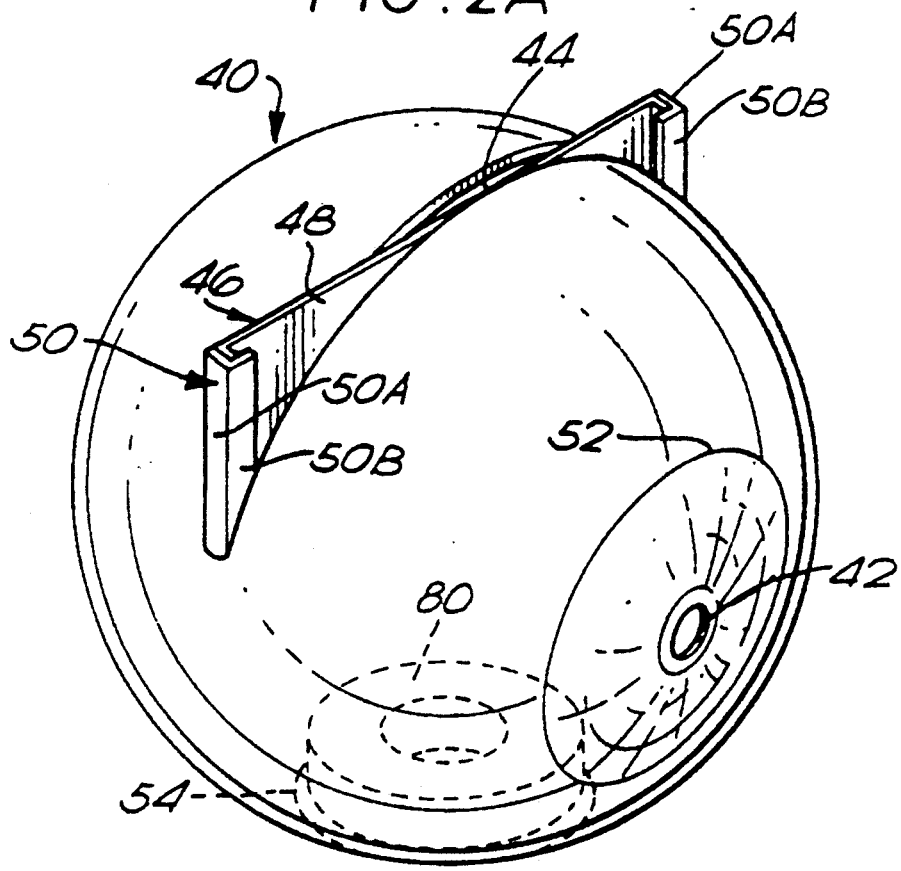
FIG. 2 shows at A and B respectively perspective and sectional side views of a second aid embodying the invention.
Figure 2A:
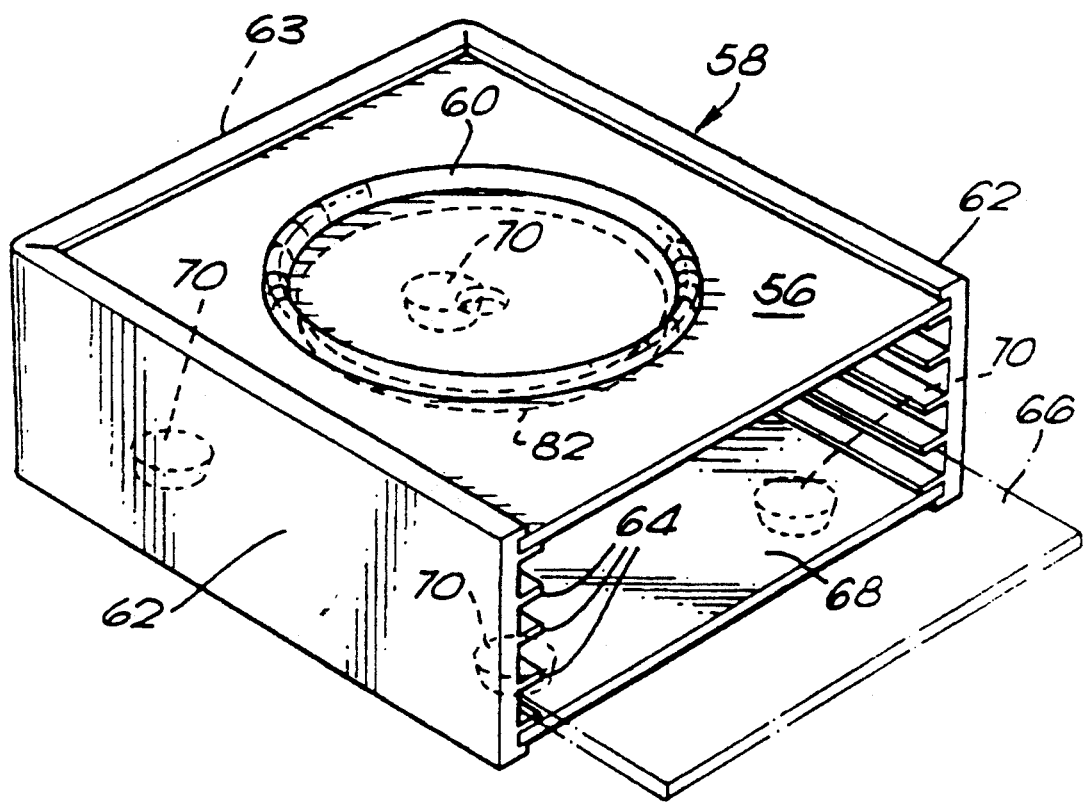
Figure 2B:
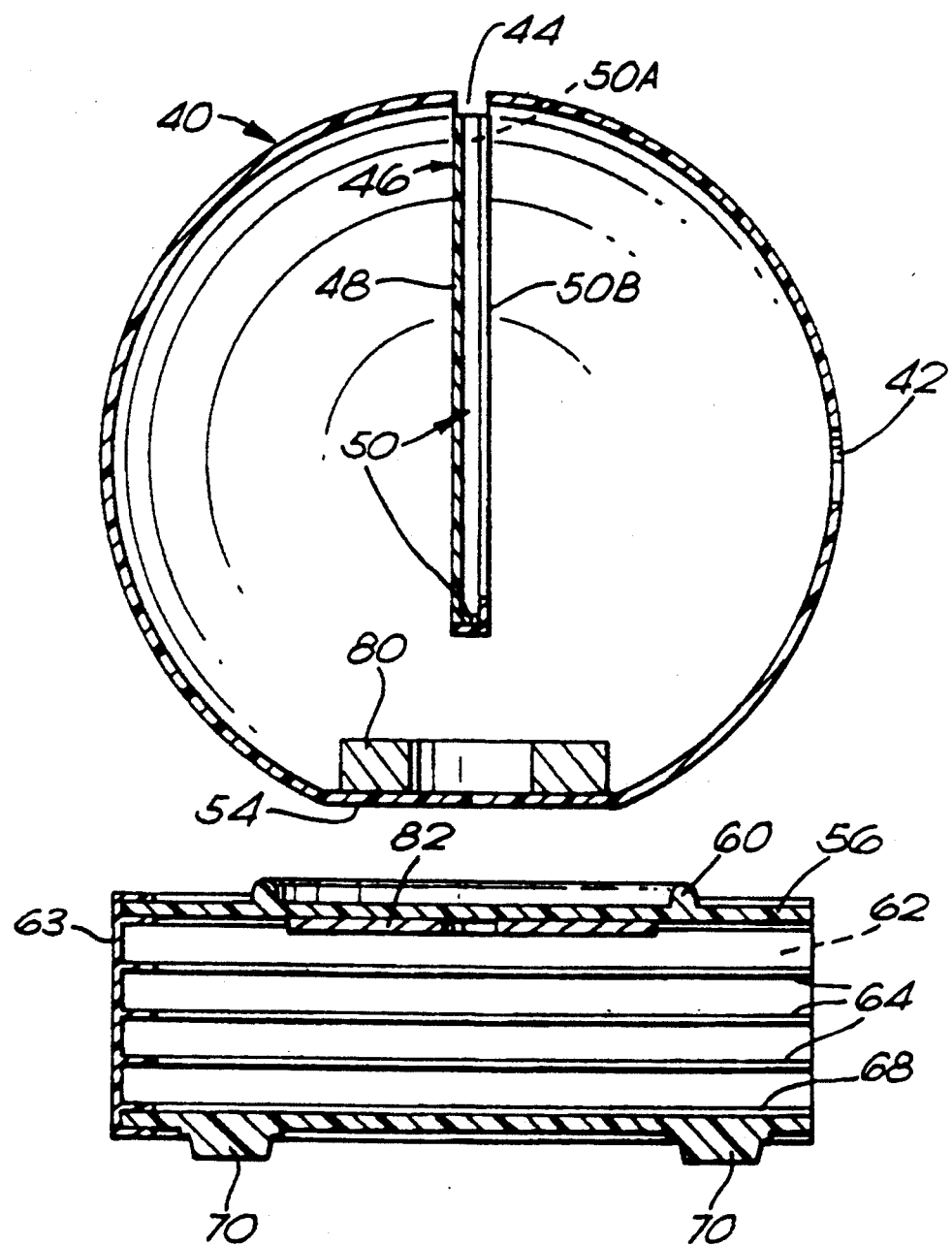

A modified form of the aid is shown in FIG. 2 to comprise a hollow spherical chamber 40 a wall of which is formed with an aperture 42 as shown.

The chamber wall is further formed with a slot 44 through which extends a frame 46 which extends through slot 44 into the interior of chamber 40 and diamtrically thereacross.

Frame 46 is of of substantially the same form as the frame described above with reference the FIG. 1 and comprises a generally flat plate 48 having L-shaped members 50 running along each, vertical as viewed, side and the lowermost peripheral edge thereof.

Each member 50 has a portion 50A extending normally of plate 50 and a portion 50B extending generally parallel to and overlying part of plate 50.

The area of the outer surface of the chamber 40 surrounding the aperture 42 may be decorated, if desired, as shown by having printed or in some other fashion placed thereon the image of the iris of an eye as shown at 52.

The lowermost part of the chamber 40 —diametrically opposed to slot 44 —outer wall of the chamber 10 is formed with a flat 54 which enables the chamber to be stood upon a level surface without danger of the chamber rolling away.

In particular the chamber 40 is adapted to rest on the uppermost wall 56 of a base support 58, which wall 56 is provided with an annular upstanding rib 60 adapted such that the flat 54 of the chamber 40 will just fit within it.

As noted wall 56 is the uppermost wall of a base support 58 having solid side wall 62 and a rear wall 63 to define a box like volume open to one, the front, end thereof. The facing surfaces of the side walls 62 (and the forward facing surface of wall 63) are provided as shown with a plurality of square section ribs 64 at an appropriate spacing to act as edge supports for photographic images 66 to be used in the chamber 40.

The uppermost and lowermost pairs of ribs 64 may with utility be provided to act as supports for the upper wall 56 and a lower wall 68 of the base support 58.

The lowermost surface of the lower wall 68 is preferably provided with rubber or other suitable material feet as illustrated at 70.

With particular advantage the lowermost, inner surface of the chamber 40 carries a magnetic material member 80 and a magnetizable material plate (e.g. mild steel) 82 is provided on the under surface of the upper wall 56 of the base support. In this way the chamber and base support are magnetically biased together when chamber 40 is placed on wall 56 within the annular rib 60.

It is believed that this modified form of teaching aid may be of particular advantage in that it is more easily held in the hands of a user, or of an instructor of a person learning to make use of an ophthalmoscope.

The parts of the chamber and base support of the aid of FIG. 2 may be made in any suitable way —e.g by moulding from any suitable plastics material and thereafter be interfitted together with suitable solvent welding or adhesives to make the parts of the aid as shown.

Figure 3A:
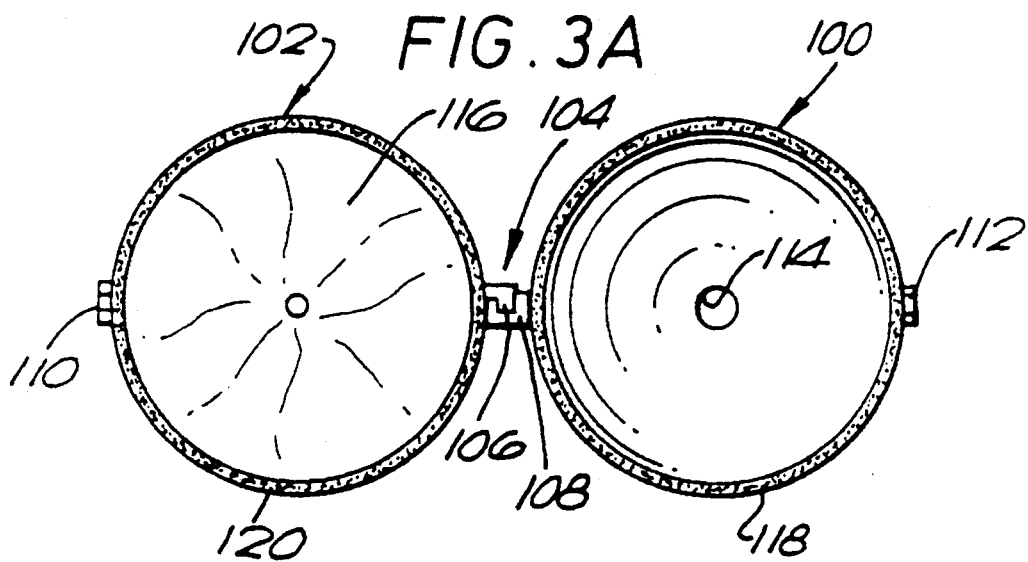
FIG. 3 illustrates an alternative form of teaching aid embodying the invention showing the aid open at 3A and closed at 3B.

FIG. 3 illustrates another alternative embodiment of the invention and in particular provides a teaching aid which will closely approximate to the physical shape of a human eye.

The aid shown in FIG. 3 comprises two generally hemispherical members 100 and 102 which are releasably hinged linked together at 104. It will be noted that the hinged linking of the parts 100 and 102 is provided by a spigot 106 carried on the edge of member 102 and received in an aperture in a second part of the hinge 108 carried on the other member 100. With such an arrangement the members 100 and 102 may, when the teaching aid is open as shown in FIG. 4A, be readily separated by moving member 102 upwardly (as viewed in the Figure) relative to member 100 such that the spigot 106 is carried out of the aperture in the second part of the hinge 108.

Diametrically opposite the hinged parts 106 and 108 the hemispherical members 102 and 100 carry cooperating parts 110 and 112 of any suitable latch mechanism as shown.

Generally centrally of member 100 there is provided an aperture 114 and the inner, concave surface of the hemispherical member 102 has imprinted therein a photographic reproduction of the retinal surface of an eye as illustrated generally at 116.

Figure 3B:
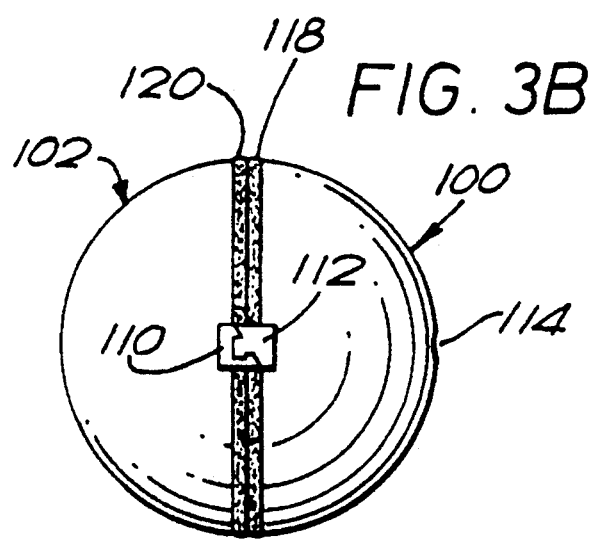

The edges of the members 100 and 102 which meet, when the two halves rotated to close the chamber they form (as shown in FIG. 3B), carry a generally light-tight sealing arrangement provided, for example, as a strip of compressible (e.g. natural or synthetic rubber) material on each of those edges as shown at 118 and 120.

It will be appreciated that when the two halves of the teaching aid are rotated such that the chamber is closed, and latch parts 110 and 112 interengage to seal the chamber the interior of the chamber may be viewed by a user with an ophthalmoscope looking through the aperture 114 at the image 116 of the retinal surface of an eye imprinted on the inner surface of the hemisphere 102.

If desired to change the image shown on the rear member 102 the aid is simply opened and the members 100 and 102 separated as noted above, the member 102 being replaced with another, similar, member 102 having imprinted on its inner concave wall a picture of another retinal surface of an eye with a patient having another physical condition (or perhaps for reference purposes a healthy patient).

It will be appreciated that the aids so far described may be modified without departing from the scope of the present invention.

One modification that may be made is that the apertures 16, 42 and 114 provided in the hemispherical members 12, 40 and 100 which are described as simple apertures extending through those hemispherical members may be provided as a lens approximating to the lens of the human eye.

As with the variations that may be obtained by changing the photographic images 26 —or the hemispherical members of 102 —it is possible that any lens provided in the aperture 16, 42 or 114 may be varied such that a variety of different lens conditions may be provided to a student or other learning to make use of an ophthalmoscope. In this way the aid may be used to mimic the various distortions which may be caused by different lens conditions.

This and another modification which may be provided in the aids described above is illustrated in FIG. 4.

Figure 4:
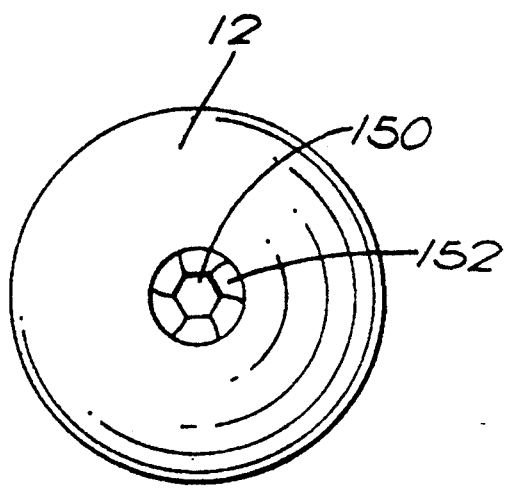
FIG. 4 illustrates detail of a modified form of the aids shown in FIG. 1 to 3.

In the modified form of the aid 10 of FIG. 1 which is illustrated in FIG. 4 the aperture in wall 12 has been provided with lens 150 and a shutter mechanism 152 thereabove. The shutter mechanism 152 may be driven to more or less vary the size of the aperture in order to mimic physical differences in pupil size which may be encountered by the user of the aid when thereafter treating human patients. The shutter mechanism 152 may be mechanically driven to alter the size of the aperture 16 or may be coupled to a light sensing device such that the teaching aid will closely mimic the eye of a human patient the shutter mechanism responding to light falling on the patients eye in the manner of the iris of such a patient.

Yet a further modification which may be made is in the mechanism for displaying pictures of retinal surfaces within the teaching aid. If it is desired to display a plurality of different pictures in rapid succession —e.g. in order to show the development of a particular condition affecting a patients eye —it is possible that a plurality of different pictures may be provided mounted on a carriage each of which is mechanically movable into the aid for viewing.

It is envisaged that the teaching aids described above will be provided in a number of different sizes such that a user of the aid learning to make use of an ophthalmoscope may —as his or her ability to use that instrument increases —progress to smaller and smaller teaching aids until such time as he is using an aid approximating in size to a human eye.

The aids described above are all intended to be hand held however, it will be seen that the aids may be provided with means enabling them to be more easily gripped and/or stood on a flat surface.

It will be seen that variations other than those described may be made without departing from the scope of the invention —for example the photographic images may if desired be replaced with drawings of appropriate retinal surfaces for viewing in the aids described.

With particular advantage it is suggested that with aids approximating the size of a human eye it would be desirable for them to be mounted in a model of all or part of a human head.

Unless described specifically above to be made of other materials, it will be appreciated that the aids disclosed herein, and the parts thereof, may be of any suitable wood, metal or plastics material.

I claim:

1. A teaching aid comprising in combination a generally spherical hollow chamber, a plurality of different photographic images of retinal portions of eyes and a base support having a generally flat upper surface, wherein said chamber has formed in a first generally hemispherical wall section thereof an aperture through which the interior of the chamber may be viewed and in a further wall section thereof a slot, wherein a frame is provided to extend through said slot from the exterior to the interior of the chamber such that selected ones of said plurality of different photographic images may be passed through said slot to be held in the frame within the chamber in a position in which they may only be viewed through said aperture, the chamber being further provided with a flat portion on the outer surface thereof generally diametrically opposed to said slot by which the chamber may rest on said generally flat upper surface of said base support, and wherein the chamber and base support are provided with respective magnetized and magnetizable elements such that when placed on the base support the chamber is biased to remain thereon.

2. An aid as claimed in claim 1, wherein the frame comprises a generally rectangular flat part three peripheral edges of which are provided with generally L-shaped elements upstanding from and partially overlying the plane of the flat part so that a photographic image passed to the frame is held by the L-shaped elements on the flat part of the frame.

3. A plurality of teaching aides each as claimed in claim 1, the diameters of the chambers of which are of different dimensions.

4. A teaching aid comprising a generally spherical hollow chamber having sections in which are formed an aperture through which the interior of the chamber may be viewed and a slot for insertion of one of a plurality of photographic images, a frame adapted to extend through said slot from the exterior to the interior of the chamber such that the selected ones of a plurality of different photographic images of retinal portions of eyes may be passed through said slot to be held in the frame with the chamber in a position at which they may only be viewed through said aperture, a base support having a flat upper wall, said chamber being further provided with a flat wall on the outer surface thereof generally diametrically opposed to said slot by which the chamber may rest on the flat upper wall of said base support, the chamber and the base support being provided with respective magnetized and magnetizable elements such that when placed thereon the chamber is biased to remain on the base support.

5. An aid as claimed in claim 4, wherein the base support is provided with a plurality of support elements for holding photographic images which may be used in the chamber.

* * * * *